(12) United States Patent
Hewett et al.

(10) Patent No.: US 7,044,082 B1
(45) Date of Patent: May 16, 2006

(54) ENVIRONMENTAL ENRICHMENT OF CAGED ANIMALS

(75) Inventors: Amanda Sara Hewett, London (GB); David Adrian Key, London (GB)

(73) Assignee: Medical Research Council, London (GB)

(\*) Notice: Subject to any disclaimer, the term of this patent is extended or adjusted under 35 U.S.C. 154(b) by 138 days.

(21) Appl. No.: 10/070,348

(22) PCT Filed: Jul. 3, 2001

(86) PCT No.: PCT/GB01/02949

§ 371 (c)(1),
(2), (4) Date: Feb. 28, 2002

(87) PCT Pub. No.: WO02/03782

PCT Pub. Date: Jan. 17, 2002

(30) Foreign Application Priority Data

Jul. 6, 2000 (GB) .................................. 0016507.6

(51) Int. Cl.
*A01K 1/00* (2006.01)
*A01K 31/06* (2006.01)

(52) U.S. Cl. ..................... 119/452; 119/417
(58) Field of Classification Search ............. 119/452, 119/417, 453, 496, 464, 475, 477, 703, 459; D30/119; 297/451.11, 451.12
See application file for complete search history.

(56) References Cited

U.S. PATENT DOCUMENTS

| | | | | |
|---|---|---|---|---|
| 1,227,471 A | * | 5/1917 | Mack | 119/460 |
| 1,948,601 A | * | 2/1934 | Thomas | 43/69 |
| D244,949 S | * | 7/1977 | Welker | D30/108 |
| 4,494,652 A | * | 1/1985 | Nelson et al. | 206/366 |
| 4,696,259 A | * | 9/1987 | Fewox | 119/482 |
| 4,852,321 A | * | 8/1989 | Fleming, Jr. et al. | 52/306 |
| 4,940,017 A | * | 7/1990 | Niki et al. | 119/418 |
| 5,000,120 A | | 3/1991 | Coiro, Sr. et al. | |
| 5,092,269 A | * | 3/1992 | Phillips et al. | 119/452 |
| 5,163,380 A | | 11/1992 | Duffy et al. | |
| 5,322,159 A | * | 6/1994 | Houlihan | 206/45.2 |
| 5,392,733 A | * | 2/1995 | Tominaga | 119/165 |
| 5,474,025 A | * | 12/1995 | Lee | 119/464 |
| D379,683 S | * | 6/1997 | Deitrich et al. | D30/119 |
| 5,664,525 A | * | 9/1997 | Phillips et al. | 119/452 |

(Continued)

FOREIGN PATENT DOCUMENTS

FR         2191836         2/1974

(Continued)

OTHER PUBLICATIONS

"CritterTrail One Small Animal Cage," PetCo "S.A.M. Palace Kit," www.Allpets.com.*

(Continued)

*Primary Examiner*—Robert P. Swiatek
(74) *Attorney, Agent, or Firm*—Barnes & Thornburg LLP

(57) ABSTRACT

A cage or an item of cage furniture for use by a caged rodent comprises a coloured material which is transparent or translucent to a human observer, but is perceived as being substantially darkened or opaque by the caged rodent. The cage or item of cage furniture typically comprises, and is desirably substantially or entirely formed from, a red-coloured or red-tinted material, e.g. a synthetic plastics material. The coloured material preferably transmits less than 20% of visible light with a wavelength of less than 540 nm. The plastics material is preferably resistant to repeated autoclaving and conveniently comprises at least one of polyester, polysulfone, polytheramide and polycarbonate. Also a method of making such a cage or item of cage furniture.

15 Claims, 2 Drawing Sheets

U.S. PATENT DOCUMENTS

| | | | |
|---|---|---|---|
| 5,722,348 A * | 3/1998 | Phillips et al. | 119/452 |
| 5,797,350 A * | 8/1998 | Smith | 119/475 |
| 5,862,778 A * | 1/1999 | Matsumoto | 119/472 |
| 5,894,816 A * | 4/1999 | Coiro et al. | 119/417 |
| 5,904,019 A * | 5/1999 | Kooij et al. | 52/306 |
| 5,921,204 A | 7/1999 | Johnson | |
| 6,123,047 A * | 9/2000 | Sakai | 119/452 |
| 6,234,115 B1 * | 5/2001 | Blum et al. | 119/472 |
| 6,328,385 B1 * | 12/2001 | Lau | 297/452.41 |
| 6,336,427 B1 * | 1/2002 | Gabriel et al. | 119/475 |
| 6,357,394 B1 * | 3/2002 | Waters et al. | 119/472 |

FOREIGN PATENT DOCUMENTS

| | | | |
|---|---|---|---|
| GB | 2148087 A * | 5/1985 | |

OTHER PUBLICATIONS

"Small Pet Cage Accessories," SuperPet Various Animal Accessories, www.PetsMart.com (8 pages total).*

* cited by examiner

ENVIRONMENTAL ENRICHMENT OF CAGED ANIMALS

FIELD OF THE INVENTION

This invention relates to a cage and an item of cage furniture for providing environmental enrichment to a caged animal, and to a method of making such a cage and such an item of cage furniture.

BACKGROUND OF THE INVENTION

Animals, especially rodents, such as mice, rats and hamsters, are often kept in a cage as domestic pets. It is well known to provide shelter-type objects and other items in the cage, in order to create a more stimulating environment for the animal. This is referred to as environmental enrichment, and the articles used in cages to provide such enrichment are referred to generally as "cage furniture".

As well as being kept as domestic pets, rodents are also kept in cages for use in research of various kinds. Conventionally, cages housing animals for use in research purposes are substantially devoid of cage furniture. However, there is a growing realisation that animals kept for research purposes should also be provided with an enriched environment, and some items of cage furniture intended for use in industrial/research settings are now available. It is a general object of the invention to provide an improved cage or type of cage furniture, especially an item of cage furniture for use in cages housing animals for use in industrial/research settings.

SUMMARY OF THE INVENTION

In a first aspect the invention provides a cage or an item of cage furniture for use by a caged animal, the cage or cage furniture comprising a material which is transparent or translucent to a human observer, but is perceived as being substantially darkened or opaque by the caged animal.

In embodiments of the invention in the form of a cage, the cage may be of generally conventional construction.

In embodiments of the invention in the form of an item of cage furniture, the item conveniently takes the form of a shelter, large enough for at least one caged animal to be accommodated therewithin, preferably large enough to accommodate two or more caged animals.

The cage or item of cage furniture in accordance with the invention is typically intended for use with one or more caged rodents, especially a rat or, more preferably, a mouse, and will therefore be dimensioned accordingly.

Preferably a cage or item of cage furniture in accordance with the invention is substantially or entirely formed from a substance which is transparent or translucent to a human observer but substantially darkened or opaque to the caged animal. In preferred embodiments, the cage or the item of cage furniture is formed entirely from a synthetic plastics material, preferably by moulding, and preferably as a single component. It is also preferred that the material comprising the cage or the cage furniture is resistant to repeated autoclaving (e.g. substantially retains its original shape and degree of transparency/translucency to a human observer after at least 100 passes through an autoclave operating under normal sterilisation conditions of 121° C.). Suitable commercially available plastics materials include polyester; polysulfone, e.g. in the form of H-Temp (H-Temp is a Trade Mark) from Techniplast; polytherimide, e.g. in the form of U-Temp (U-Temp is a Trade Mark) from Techniplast; and polycarbonate, e.g. in the form of Makrolon (Makrolon is a Trade Mark).

Typically the cage or item of cage furniture will be formed from a coloured material. The colour may be an inherent property of the material, or the material may comprise a tinting compound or mixture to provide the desired colour. In preferred embodiments, the cage or item of cage furniture comprises, and is desirably substantially or entirely formed from, a red-coloured or red-tinted material. By way of explanation, the inventors have observed that rodents, especially mice, are significantly less sensitive to red light than are humans. Accordingly, shelters comprising or formed from red-coloured or red-tinted materials are perceived by these animals as being rather dark, which thus approximates more closely to the holes or nests which mice use in their natural habitat. The inventors have discovered that this encourages greater use of the shelter, and behavioural activity which more closely follows that adopted by the animals in their natural habitat.

At the same time, being transparent or translucent to humans, a person working with or looking after the caged animals, can observe the animals at all times, even if they are inside a shelter-type item of cage furniture. Thus, for example, a researcher can monitor the behaviour of the animals visually, and can count the number of animals in a cage, at any time. Thus a cage or an item of cage furniture in accordance with the invention provides an improved degree of environmental enrichment for the caged animals, whilst not obstructing visual observation of the animals within the cage or using the cage furniture.

In particular the inventors have surprisingly found that materials with particular optical qualities are preferred for cages and/or items of cage furniture, especially such cages or items of cage furniture intended for rodents such as rats and, especially, mice.

In preferred embodiments, the cage or item of cage furniture comprises or consists of a material which substantially blocks (i.e. transmits less than 20%, preferably less than 15% of) visible light with a wavelength less than 540 nm. Desirably, the material substantially blocks visible light with a wavelength of less than 560 nm, more preferably less than 570 nm and most preferably 580 nm. Such materials are commercially available and include readily available plastics filters, especially "cut-on" filters.

A particularly preferred material (such as a Lee polyester filter with a "cut-on" wavelength of 593 nm) substantially blocks (i.e. transmits less than 20% of) visible light with a wavelength of less than 580 nm, whilst being transparent (i.e. transmitting at least 60%) of visible light with a wavelength of 600 nm or more.

Without wishing to be bound by any particular theory, the inventors believe that caged animals such as rodents prefer cages and shelters to be darkened relative to the surrounding environment, but that the cage or shelter should not be perceived by the animals as completely dark, so as to allow some light cues to animals within the cage or shelter as to the presence of other animals (e.g. potential predators) outside. According to this hypothesis, a preferred cage or cage furniture material (as represented by 'B' in FIGS. 3 and 4) transmits some light of non-red or very short red wavelengths (e.g. 580–590 nm), to which the animals are sensitive and therefore provides the animals with some visual cues. However, the great majority of visible light wavelengths (below 580 nm), to which the animals are sensitive, are substantially blocked so as to provide a desirable darkening. Materials (C–E in FIGS. 3–4) which do not transmit sufficient light in the 580–590 nm wavelength range do not give the animals sufficient light to provide the desired visual cues, and are therefore not so suitable, whilst other materials (e.g. A in FIGS. 3–4) transmit too much light in the 580–590 nm range and are not perceived by the animals as being sufficiently dark.

From the point of view of a human observer, however, material 'B' is substantially transparent in the range 600 nm and above, to which the human eye is reasonably sensitive, so that animals within the cage or item of cage furniture are readily visible.

For present purposes, "visible light" is intended to mean light having a wavelength in the range 350–700 nm.

A preferred embodiment of cage furniture in accordance with the invention takes the form of a substantially right-angled triangular shaped floorless shelter, which can therefore be located in a corner of a cage, leaving a considerable free area for the animals to more around outside the shelter. In addition, such a corner location tends to prevent the animals from moving the shelter (if unfixed), because the cage abuts the shelter on two sides.

If desired, the cage furniture can be provided with fixing means to restrict the movement of the cage furniture within the cage. Typically such fixing means comprises a fixing member, which engages with the cage, conveniently with the roof or lid thereof. In one embodiment the fixing means comprises a chain (typically metallic) which detachably engages with one or more bars in the lid of the cage. This arrangement allows for lifting of the cage furniture when the lid of the cage is removed, thus enabling a person to obtain access to any of the animals in the cage (e.g. for removal from the cage for whatever reason).

Further, a preferred embodiment of the invention will comprise at least two, possibly more, entrances into the shelter.

In a second aspect the invention provides a method of making a cage or an item of cage furniture, the method comprising the step of forming said cage or item of cage furniture, so as to comprise a material which is transparent or translucent to a human observer, but is perceived as being substantially darkened or opaque by a caged animal. Preferably performance of the method results in a cage or an item of cage furniture having one or more of the preferred features of the first aspect of the invention as defined above.

The invention will now be further described by way of illustrative example and with reference to the accompanying drawings, in which.

EXAMPLE 1

Figure 1:
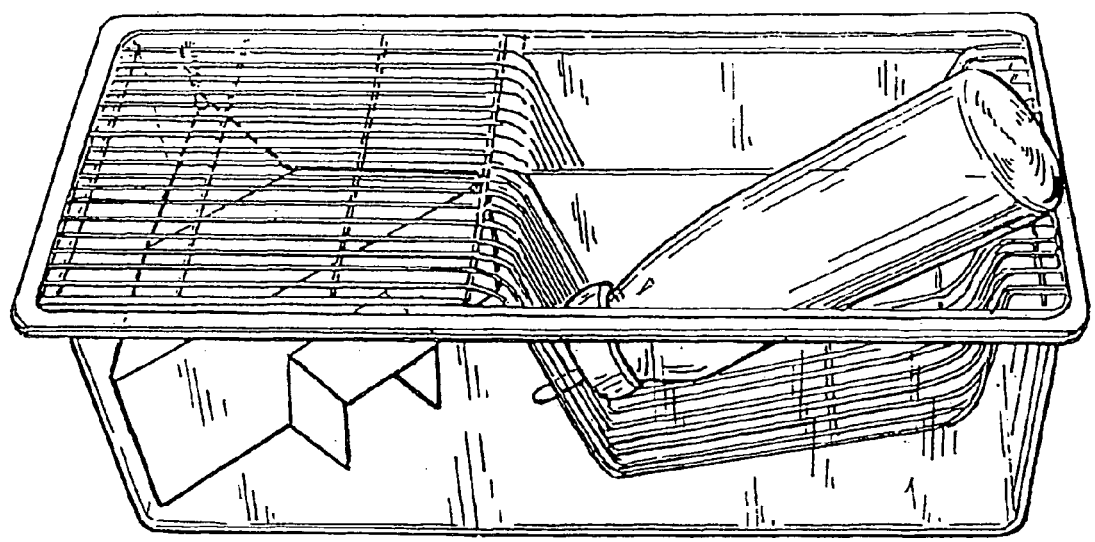
FIG. 1 shows a prototype of an item of cage furniture in accordance with the invention in position in a corner of a conventional animal cage.

A preferred embodiment of an item of cage furniture in accordance with the invention takes the form of a floodless shelter, formed from a single piece of synthetic plastics material which is translucent to a human observer, but tinted with a red colouration. A prototype of the embodiment is shown in FIGS. 1 and 2.

Figure 2:
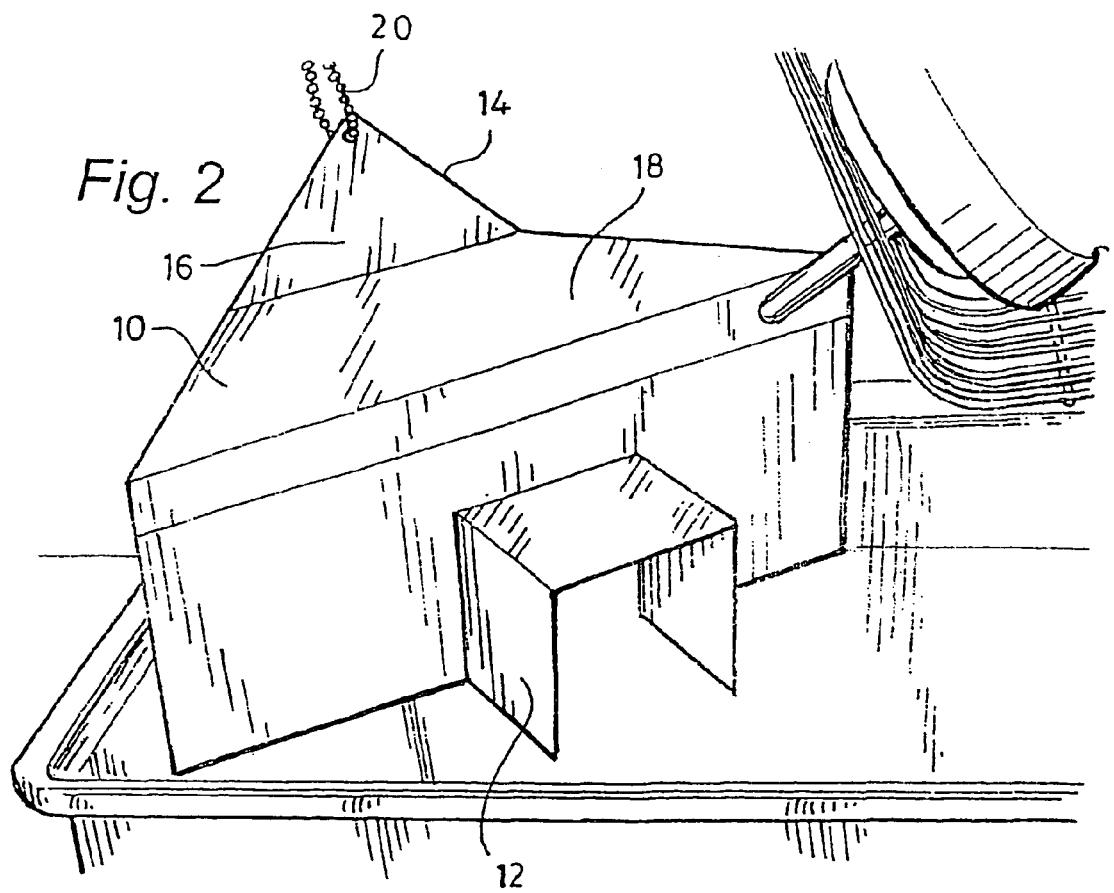
FIG. 2 shows, to a different scale, the prototype illustrated in FIG. 1 partially removed from the cage.

With reference to FIG. 2 the shelter 10 is substantially triangular in shape, and may therefore be conveniently located in a corner of a conventional rodent cage. The shelter 10 is suitably dimensioned such that at least two mice or similar-sized animals can be accommodated therewithin.

The shelter 10 has two means of entrance/egress, a "main" entrance 12, and a "minor" entrance 14. The main entrance 12 takes the form of a three-sided short tunnel-like addition to the front face of the shelter 10, which faces the space inside the cage. The minor entrance 14 is formed by a triangular-shaped raised corner portion 16 of the otherwise flat roof 18 of the shelter 10.

The raised corner portion 16 comprises a perforation, so as to receive fixing means, which fixing means comprises a metal chain 20. The chain 20 is looped around a bar in the lid of the cage, such that when the lid of the cage is raised, the shelter 10 is also lifted. The chain 20 comprises a barrel-like portion, which allows two ends of the chain to be detachably engaged in a screw-threaded engagement, such that the chain may be closed to form a loop, or opened to remove the shelter from the cage lid.

The flat roof 18 and the flat portion of the main entrance 12 provide two substantially horizonal stepped surfaces, to allow, for example, for caged animals to climb between the floor of the cage and the roof 18 of the shelter 10.

The shelter 10 is formed from a single piece of Makrolon polycarbonate synthetic plastics material having a red tint. This material is resistant to repeated autoclaving washing, and is also resistant to gnawing and chewing by rodents. The material is also essentially non-toxic to humans and rodents.

The sides of the shelter 10 are about 11.5 cm long, whereas the front face (containing the main entrance 12) is about 16 cm long. The main body of the shelter 10 is about 6 cm high. The main entrance 12 forms a short tunnel, projecting about 2 cm from the front of the shelter 10. The main entrance 12 is about 4½ cm wide and 2½ cm high.

The inventors have observed that a low entrance is just high enough to permit entrance of a normal sized mouse, and that mice prefer such a low entrance as being similar to: their preferred natural habitats. The width of the entrance is such that even pregnant female mice may still pass freely in or out of the shelter via the main entrance. This allows family groups to be housed in a single cage and permits all animals in the group to use the cage furniture.

EXAMPLE 2

The inventors conducted a trial, comparing a shelter substantially as described in Example 1 above (referred to as the "Mousehouse"), with shelters based on two other items of commercially available cage furniture: one in the form of a substantially cylindrical, open-ended tube (the "tunnel" design) and one in the form of a substantially box-like shelter, with opposed sides comprising apertures formed by raised flaps (the "hangar" design). The tunnel and hangar designs as available commercially are of clear perspex material, and were modified by having a red tint applied.

Mice were placed in a cage containing one of the three items of cage furniture, and monitored for a fixed amount of time each day. A control group was also included, which comprised cages devoid of any cage furniture. Specific types of behaviour were noted, if exhibited by the mice, some behaviours being indicative of a degree of stress, other behaviours being similar to those observed in mice in their natural habitat and being indicative of a more "relaxed" state.

The method used in the trial was an application of "time budget sampling", a technique described by Martin and Bateson in 1986, "Measuring Behaviour: An introductory guide, CUP". This essentially gives a slice of an animal's behavioural repertoire at a designated time every day. In the present experiment this was in the dark phase, when the mice are most active.

The trials used 48 BALB/c mice at 7 weeks of age. The mice were divided into four groups by cage type as described above, including a control group. Each group consisted of six male mice (held in two cages of three animals) and six female mice (also in two cages). Each animal was observed on three separate occasions and each observation was for five seconds per animal. This was done within a two-hour period, during the dark phase of their light cycle. These observations were done four times in each week and the study ran for four weeks.

Data were analysed using ANOVA (Analysis of Variations) method. This is a standard procedure which compares mean scores across different groups.

Statistical significance was determined at a value of less than 0.05. The results of the trial are shown below in Table 1. In summary, animals housed in cages containing a shelter in accordance with the invention used the shelter far more than those housed in cages with the other items of cage furniture; exhibited more natural diurnal behaviour; engaged in significantly more natural self-grooming and teeth maintenance, and less running; and were generally less stressed.

The adrenal glands of the mice were also examined. The adrenal glands of the mice housed in cages containing a shelter in accordance with the invention were lighter than those of other mice. Male mice, in particular, showed a considerable difference. A lighter adrenal gland indicates that less adrenaline is being produced, suggesting a less stressed animal.

TABLE 1

| Behaviour | Whole-population comparison | Males-only comparison | Females-only comparison |
| --- | --- | --- | --- |
| Grooming self | Mousehouse mice groomed significantly more than tunnel, Control and Hangar mice | Mousehouse mice groomed significantly more than tunnel mice | Mousehouse mice groomed significantly more than tunnel, Control and Hangar mice |
| Grooming others | No significant differences | No significant differences | No significant differences |
| Sniffing/ investigation of others | Mousehouse mice sniffed/ investigated others significantly more than tunnel and Control mice | No significant differences | Mousehouse mice sniffed/ investigated others significantly more than tunnel, Hangar and Control mice |
| Sniffing bedding | Mousehouse mice sniffed bedding significantly less than Control mice | Mousehouse mice sniffed bedding significantly less than Control mice | Mousehouse mice sniffed bedding significantly less than Control mice |
| Sniffing bars | Mousehouse mice sniffed bars significantly less than tunnel, Control and Hangar mice | Mousehouse mice sniffed bars significantly less than tunnel and Control mice | Mousehouse mice sniffed bars significantly less than tunnel, Control and Hangar mice |
| Sniffing cage sides | Mousehouse mice sniffed cage sides significantly less than Control and tunnel mice | Mousehouse mice sniffed cage sides significantly less than Control mice | Mousehouse mice sniffed cage sides significantly less than Control and tunnel mice |
| Sniffing through bars | Mousehouse mice sniffed through bars significantly less than Hangar mice | Mousehouse mice sniffed through bars significantly less than Hangar mice | No significant differences |
| Gnawing bars | Mousehouse mice gnawed bars significantly more than tunnel and Control mice | Mousehouse mice gnawed bars significantly more than tunnel and Control mice | Mousehouse mice gnawed bars significantly more than Control mice |

TABLE 1-continued

| Behaviour | Whole-population comparison | Males-only comparison | Females-only comparison |
| --- | --- | --- | --- |
| Climbing/ holding bars | Mousehouse mice climbed/held bars significantly less than Control mice | No significant differences | Mousehouse mice climbed/held bars significantly less than Control mice |
| Floor to bar wheeling | No significant differences | No significant differences | No significant differences |
| Base wheeling | No significant differences | No significant differences | No significant differences |
| Running around cage | Mousehouse mice ran significantly less than tunnel and Control mice | Mousehouse mice ran significantly less than tunnel and Control mice | Mousehouse mice ran significantly less than tunnel and Control mice |
| Jumping | No significant differences | No significant differences | No significant differences |
| Climbing on furniture | No significant differences | No significant differences | No significant differences |
| Resting on furniture | Mousehouse mice rested on furniture significantly more than tunnel mice | Mousehouse mice rested on furniture significantly more than tunnel mice | Mousehouse mice rested on furniture significantly more than tunnel mice |
| Entering furniture | Mousehouse mice entered furniture significantly more than Hangar and tunnel mice | Mousehouse mice entered furniture significantly more than Hangar and tunnel mice | Mousehouse mice entered furniture significantly more than Hangar and tunnel mice |
| Leaving furniture | Mousehouse mice left furniture significantly more than Hangar and tunnel mice | Mousehouse mice left furniture significantly more than Hangar and tunnel mice | Mousehouse mice left furniture significantly more than Hangar and tunnel mice |

EXAMPLE 3

The aim of this trial was to determine whether, within the spectrum of red plastics, rodents would exhibit any preference for the cage furniture constructed at particular single wavelengths.

The inventors conducted a trial, comparing frequency of rodent use of a number of separate shelters, each of the same size and shape (i.e. that of the embodiment illustrated in FIG. 2).

The basic shelter was made from colourless, clear plastics material. Suitable filter materials were then applied to all the exterior surfaces of the shelters using clear, colourless adhesive (from 3M). A different filter was used for each shelter. The filters were supplied (from Lighting Technology, Park Royal, London) as 0.08 mm thickness sheets and cut to size, taking care that all of the shelter surface was covered with the chosen filter. The filters were "cut-on" filters, and possessed quoted 50% transmission levels at 614.5 nm, 610.5 nm, 602.5 nm, 593 nm and 581 nm wavelengths. The 602.5 nm filter was a "Rosco supergel" filter, made from polycarbonate. All the other filters were Lee filters, made from polyester.

Figure 3:
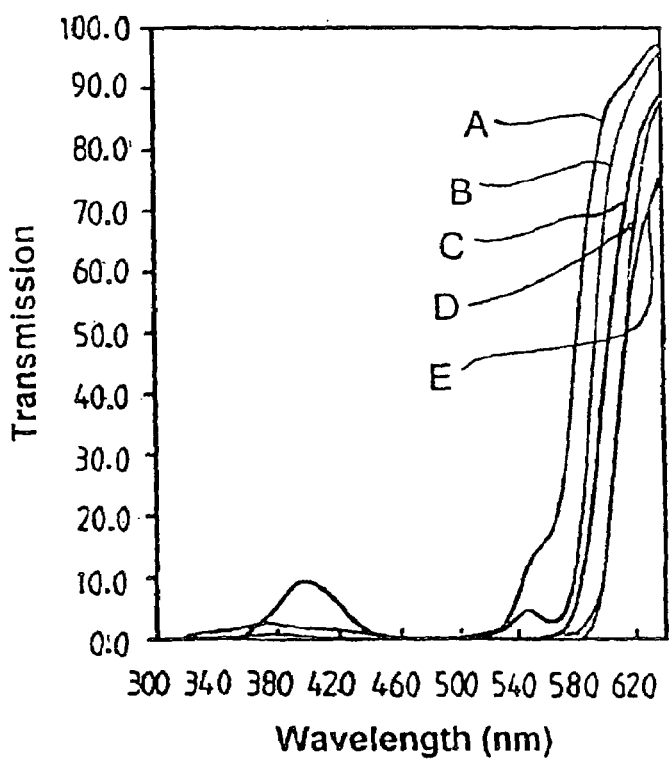
FIGS. 3 and 4 are graphs of Transmission (%) against Wavelength (nm).
Figure 4:
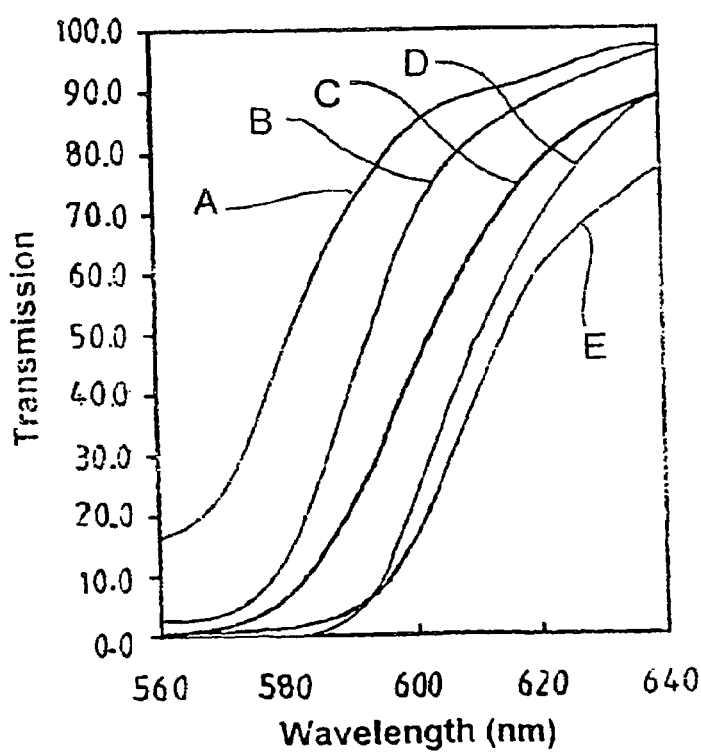

The optical properties of the filters are illustrated in FIGS. 3 and 4, which are both graphs of transmission (%) against wavelength (nm).

FIG. 3 shows the transmission properties of the filters over the wavelength range 300–620 nm. The Figure shows plots of % transmission for the various filters as follows: (A) 581 nm filter; (B) 593 nm filter; (C) 602.5 nm filter; (D) 610.5 nm filter; and (E) 614.5 nm filter. As can be seen from the Figure, all of the filters substantially blocked (i.e. transmitted less than 20% of) all visible light of wavelengths less than 540 nm. Light of longer wavelengths is transmitted, such that all of the filters transmitted are at least 60% of visible light with a wavelength of 620 nm or more, but each filter bad a particular wavelength (in the range 540–615 nm) above which the % transmission increased dramatically. This is shown more clearly in FIG. 4, which shows the same data, but for the wavelength range 560–640 nm. Again (A)–(E) refer to one of the 5 filters used. The "cut-on" wavelengths quoted for the filters transmit 50% of incident light. The % light transmitted rapidly increases above the cut-on wavelength.

The methodology employed was derived from the first trial. The same strain of animals was used and the same protocol followed (see Example 2 above). Data were again analysed using ANOVA and findings reviewed for any significances of less than 0.05. One finding emerged at the 0.05 significance level. This demonstrated that rodent use of the shelter comprising a cut-on filter at 593 nm was significantly higher than those of other wavelengths.

Since all the coloured shelters were used to varying extents, and only a small sample of possible wavelengths was trialled, the inventors cannot demonstrate a unique rodent preference. However, the findings point to an increased preference for rodent use around the 593 nm wavelength, and manufacture should concentrate on this area of the spectrum. Moreover, since a core advantage of the design is that it allows staff to view animals inside the shelter, the lighter orange/red colour of the 593 nm wavelength, is of enhanced commercial practicality.

The invention claimed is:

1. At least one of a cage and an item of cage furniture for use by a caged rodent, the at least one of the cage and the item of cage furniture comprising a coloured material which is transparent or translucent to a human observer, but is perceived as being substantially darkened or opaque by the caged rodent, wherein said coloured material transmits less that 20% of visible light with a wavelength of less than 540 nm.

2. At least one of a cage and an item of cage furniture for use by a caged rodent, the at least one of the cage and the item of cage furniture comprising a coloured material which is transparent or translucent to a human observer, but is perceived as being substantially darkened or opaque by the caged rodent, wherein said coloured material transmits less than 20% of visible light with a wavelength of less than 560 nm.

3. At least one of a cage and an item of cage furniture for use by a caged rodent, the at least one of the cage and the item of cage furniture comprising a coloured material which is transparent or translucent to a human observer, but is perceived as being substantially darkened or opaque by the caged rodent, wherein said coloured material transmits less than 20% of visible light with a wavelength of less than 580 nm.

4. At least one of a cage and an item of cage furniture for use by a caged rodent, the at least one of the cage and the item of cage furniture comprising a coloured material which is transparent or translucent to a human observer, but is perceived as being substantially darkened or opaque by the caged rodent, wherein said coloured material transmits at least 60% of visible light with a wavelength of 600 nm or more.

5. At least one of a cage and an item of cage furniture for use by a caged rodent, the at least one of the cage and the item of cage furniture comprising a coloured material which is transparent or translucent to a human observer, but is perceived as being substantially darkened or opaque by the caged rodent, wherein said coloured material transmits, on average, at least 20% of light with a wavelength in the range 580–590 nm.

6. At least one of a cage and an item of cage furniture according to any preceding claim, wherein said coloured material is red-coloured or red-tinted.

7. At least one of a cage and an item of cage furniture according to claim 6, for use by a caged rat or mouse.

8. At least one of a cage and an item of cage furniture according to claim 6, wherein the at least one of the cage and the item of cage furniture is substantially or entirely formed from a substance which is transparent or translucent to a human observer but substantially darkened or opaque to the caged animal.

9. At least one of a cage and an item of cage furniture according to claim 6, wherein the at least one of the cage and the item of cage furniture is formed entirely from a synthetics plastics material.

10. At least one of a cage and an item of cage furniture according to claim 6, wherein the material comprising the cage or cage furniture is resistant to repeated autoclaving.

11. At least one of a cage and an item of cage furniture according to claim 6, comprising at least one of polysulfone, polytherimide, and polycarbonate.

12. An item of cage furniture in accordance with claim 6, provided with fixing means to restrict the movement of the item of cage furniture within a cage.

13. An item of cage furniture in accordance with claim 6, comprising at least two entrances.

14. A method of malting at least one of a cage and an item of cage furniture, the method comprising the step of forming said at least one of cage and the item of cage furniture, so as to comprise a material which is transparent or translucent to a human observer, but is perceived as being substantially darkened or opaque by a caged rodent, and performance of which method results in production of the at least one of the cage and the item of cage furniture in accordance with claim 1.

15. A cage including an item of cage furniture for use by a caged rodent, the item of cage furniture comprising a coloured material which is transparent or translucent to a human observer, but is perceived as being substantially darkened or opaque by the caged rodent, wherein the item of cage furniture comprises a substantially right-angled triangular shaped floorless shelter.

* * * * *